US012521803B2

(12) United States Patent
Gruber

(10) Patent No.: US 12,521,803 B2
(45) Date of Patent: Jan. 13, 2026

(54) MILLING TOOL

(71) Applicant: ZECHA Hartmetall-Werkzeugfabrikation GmbH, Königsbach-Stein (DE)

(72) Inventor: Daniel Gruber, Mattighofen (AT)

(73) Assignee: ZECHA Hartmetall-Werkzeugfabrikation GmbH, Königsbach-Stein (DE)

( * ) Notice: Subject to any disclaimer, the term of this patent is extended or adjusted under 35 U.S.C. 154(b) by 730 days.

(21) Appl. No.: 17/753,005

(22) PCT Filed: Aug. 7, 2020

(86) PCT No.: PCT/EP2020/025367
§ 371 (c)(1),
(2) Date: Feb. 15, 2022

(87) PCT Pub. No.: WO2021/032316
PCT Pub. Date: Feb. 25, 2021

(65) Prior Publication Data
US 2022/0324038 A1 Oct. 13, 2022

(30) Foreign Application Priority Data
Aug. 16, 2019 (DE) ...................... 10 2019 122 039.4

(51) Int. Cl.
*B23C 5/10* (2006.01)
(52) U.S. Cl.
CPC .................. *B23C 5/1009* (2013.01)
(58) Field of Classification Search
CPC ......... B23C 5/006; B23C 5/10; B23C 5/1009; B23C 5/12; B23C 5/14; B23C 2210/24;
(Continued)

(56) References Cited

U.S. PATENT DOCUMENTS 7,959,382 B2   6/2011  Volokh et al.
9,884,379 B1   2/2018  Budda
(Continued)

FOREIGN PATENT DOCUMENTS

DE   102006026851 A1   12/2007
DE   102006026853 A1   12/2007
(Continued)

OTHER PUBLICATIONS

Office Action from the German Patent Office dated Jan. 28, 2020 in related DE application No. 102019122039, and machine translation thereof.
(Continued)

*Primary Examiner* — Sunil K Singh
*Assistant Examiner* — Eric Daniel Whitmire
(74) *Attorney, Agent, or Firm* — J-TEK LAW PLLC; Jeffrey D. Tekanic; Scott T. Wakeman

(57) ABSTRACT

The invention relates to a milling tool made of cemented carbide having a cylindrical shank (16) and a cutting head (18) for the face milling of workpieces made of a hard-brittle material. The cutting head (18) is configured as an end mill with corner radius or a ball nose end mill having a cutting length (L 2.2). The shank (16) has, up to its chucking end (26), at least one clearance segment (28) having a smaller diameter (d3) than the cutting head (18). The tip of the cutting head (18) is coated or tipped with hard mineral along a length (L2) having a diameter (d1) used for finishing, to which is connected a segment (24), which is used for roughing, having the cutting length (L2.2–L2=L2.1) and a reduced diameter (d4), which is smaller than the diameter (d1) of the cutting length (L2) on the cutting head (18) used for finishing and is greater than the diameter (d3) of the clearance segment (28).

20 Claims, 2 Drawing Sheets

(58) Field of Classification Search
CPC .......... B23C 2210/285; B23C 2210/54; B23C 2210/64; B23C 2220/605; B23C 2226/31
See application file for complete search history.

(56) References Cited

U.S. PATENT DOCUMENTS

| | | | |
|---|---|---|---|
| 2003/0235479 A1* | 12/2003 | Chihara | B23C 5/10 407/54 |
| 2004/0120777 A1* | 6/2004 | Noland | B23C 5/10 407/63 |
| 2005/0117982 A1* | 6/2005 | Dov | B23B 51/08 408/24 |
| 2007/0286691 A1 | 12/2007 | Glimpel et al. | |
| 2008/0253846 A1* | 10/2008 | Ni | B23C 5/10 407/34 |
| 2009/0252564 A1* | 10/2009 | Volokh | B23C 5/10 407/56 |
| 2018/0117685 A1 | 5/2018 | Osawa et al. | |
| 2018/0290219 A1 | 10/2018 | Hufschmied | |
| 2019/0160561 A1 | 5/2019 | Xu et al. | |

FOREIGN PATENT DOCUMENTS

| | | |
|---|---|---|
| EP | 2540427 A1 | 1/2013 |
| EP | 2540427 B1 | 3/2015 |
| JP | S5713113 U | 1/1982 |
| JP | S61163115 U | 10/1986 |
| JP | H04256513 A | 9/1992 |
| JP | 2008105121 A | 5/2008 |
| JP | 2010125594 A | 6/2010 |
| JP | 2013091161 A | 5/2013 |
| WO | 2007113812 A2 | 10/2007 |
| WO | 2016203519 A1 | 12/2016 |
| WO | 2017211462 A1 | 12/2017 |
| WO | 2018163148 A1 | 9/2018 |

OTHER PUBLICATIONS

Office Action from the Japanese Patent Office dispatched Apr. 11, 2023 in related Japanese application No. 2022-509643, and translation thereof.
Search Report from the Japanese Patent Office dated Apr. 12, 2023 in related Japanese application No. 2022-509643, and machine translation thereof.
English translation of the International Search Report dispatched Feb. 25, 2021 for parent application No. PCT/EP2020/025367.
English translation of the Written Opinion for parent application No. PCT/EP2020/025367.
Reconsideration Report by Examiner before Appeal dispatched Mar. 5, 2024, in related Japanese application No. 2022-509643, and machine translation thereof.

* cited by examiner

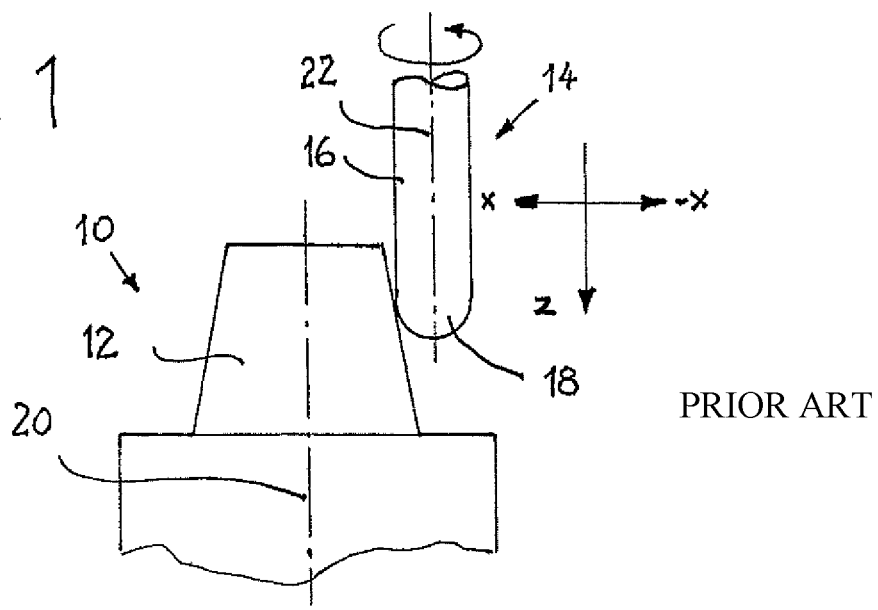
PRIOR ART
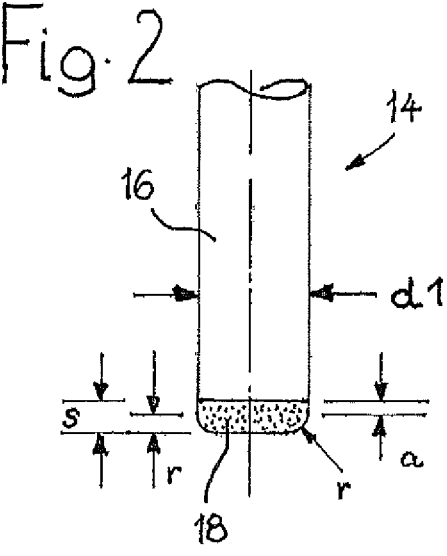
PRIOR ART
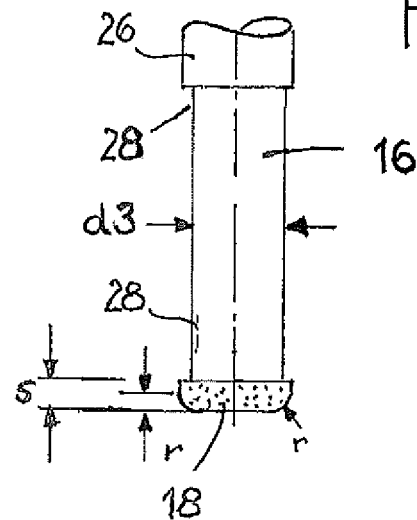
PRIOR ART

MILLING TOOL

CROSS-REFERENCE

This application is the US national stage of International Patent Application No. PCT/EP2020/025367 filed on Aug. 7, 2020, which claims priority to German Patent Application No. 10 2019 122 039.4 filed on Aug. 16, 2019.

TECHNICAL FIELD

The present invention (generally) relates to a milling tool (end mill) made of carbide having a cylindrical shank and a cutting head for face milling of workpieces made of a hard-brittle material.

BACKGROUND OF THE INVENTION

When milling workpieces made of a very hard material, the milling tools used for this purpose are subject to great wear. This problem also occurs, in particular, when profile machining workpieces made of graphite, in order to thereby produce, for example, electrodes for spark eroding, which are used for CNC machines. The graphite block used as the starting material is normally machined using an end mill made of cemented carbide, the cutting head of which can be coated or tipped with diamond.

A milling tool for this purpose is known from EP 2 540 427. There, the cutting head is suitable only for finishing due to its small coated length, which permits only a short feed; thus, the cutting head is not suitable for roughing. The adjoining length of the shaft is configured as a clearance segment and thus is not configured for cutting, so that the clearance segment is not available either for roughing milling or for finishing.

Another related milling tool is described and illustrated in DE 10 2006 026 851. However, also in this reference, a non-cutting clearance segment directly adjoins the head segment, which is used for finishing, so that two differently-configured milling tools have to be kept available and used for roughing and finishing, respectively.

The same also applies to a milling tool according to WO 2018/163148, the cutting region of which is also suitable either only for roughing or only for finishing.

SUMMARY OF THE INVENTION

It is one non-limiting object of the present teachings to disclose techniques for designing a milling tool so that it can be used both for roughing and for subsequent finishing of a workpiece.

In one aspect of the present teachings, a milling tool (end mill) includes a roughing segment, which is capable of performing a roughing milling operation and is connected to a short cutting length of the cutting head that is suited for finishing. Due to its set-back diameter, a clearance segment, which is provided axially rearward of the roughing segment, prevents undesired pressing in the radial direction during the finishing operation after the roughing operation has been performed.

In an advantageous development of the above-noted aspect, both the finishing segment and the roughing segment of the cutting head are coated or tipped with hard mineral, such as diamond.

BRIEF DESCRIPTION OF THE DRAWINGS

The present teachings are explained below with reference to an exemplary embodiment, which are illustrated in the drawings.

FIG. 1 shows a schematic illustration of a workpiece to be machined, for example, an electrode for spark eroding, using a known end mill or ball nose end mill shown in simplified form.

FIG. 2 shows a view of a known end mill with corner radius having a coated cutting head.

FIG. 3 shows, in a variant of FIG. 2, a known end mill with corner radius having a non-cutting clearance.

DETAILED DESCRIPTION OF THE INVENTION

Figure 4:
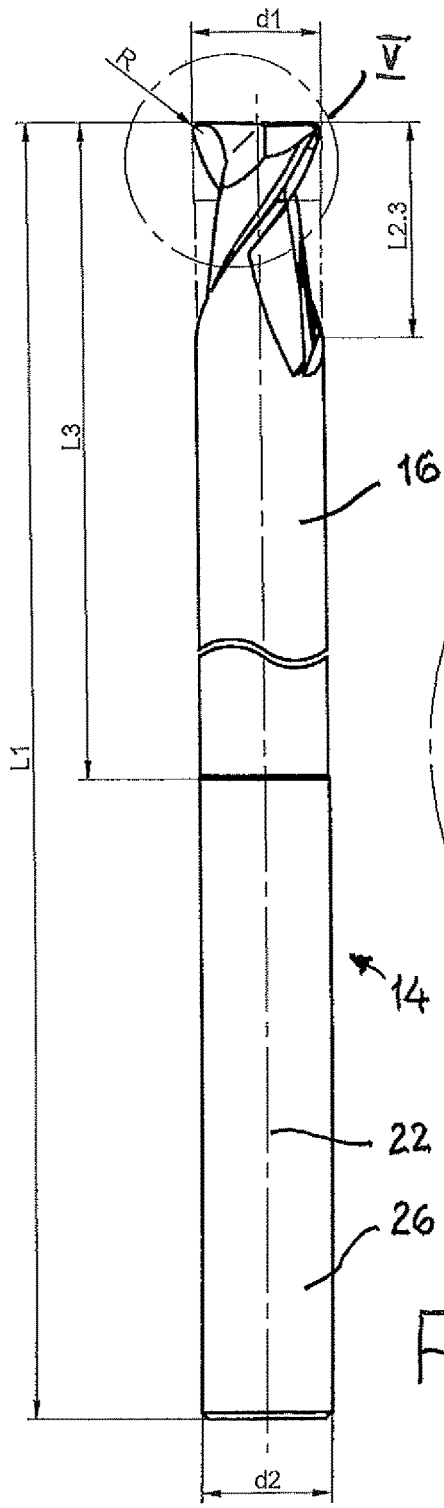
FIG. 4 shows a view of a milling tool according to one embodiment of the present teachings.

FIG. 1 schematically shows the view of a workpiece 10 made of a hard-brittle material, for example graphite, the conical upper part 12 of which is to be machined in a known manner, in order, for example, to produce an electrode for spark eroding. In order to produce the desired profile of the upper part 12, a milling tool, which is designated overall by 14 and has a cylindrical shank 16 and a ball nose-shaped cutting head 18, may be used. During the machining, the milling tool 14 rotates around its longitudinal axis 22 and simultaneously moves along the profile of the workpiece 10 around its longitudinal axis 20. More specifically, to machine (cut) the conical upper part 12, the milling tool 14 is moved both in the x-direction and in the z-direction; optionally it is moved along all three axes x, y and z.

FIG. 2 shows a schematic view of a known milling tool 14, which is configured here as an end mill with corner radius. As is known from EP 2 540 427 B1, the cutting head 18, which is provided at the tip of the shank 16 having the diameter d1, has a length s that consists of the radius r of the edge rounding and a short additional length a. The cutting head 18 has, in the height s, i.e. at the transition to the shank 16, the same diameter d1 as the shank 16. This design means that, with progressive feeding (advancement) of the milling tool 14 in the axial direction z (see FIG. 1) during roughing and finishing, the non-cutting shaft 16 is subjected to radial compressive loads and thus deformations, which not only affects the milling accuracy but can also lead to a fracture of the shank 16.

An improved configuration of the milling tool 14 according to EP 2 540 427, which is shown in FIG. 3, achieves a certain remediation here, because the shank 16 of FIG. 3 has a smaller diameter d3 than the cutting head 18, which projects radially beyond the shank 16, by height s. In this design, a non-cutting clearance 28 is formed up to the chucking end 26 of the milling tool 14, so that no radial compressive forces are generated during roughing or finishing. These forces occur only when the blade diameter d1 gradually decreases when the milling tool 14 is axially fed until it reaches the dimension d3, so that the non-cutting longitudinal region of the clearance 28 causes a radial pressing.

Figure 5:
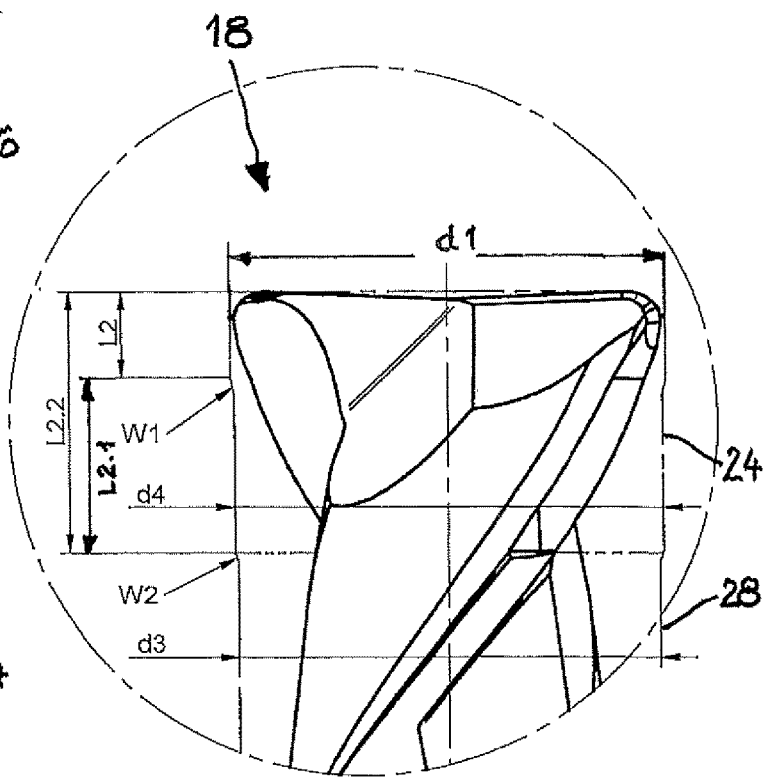
FIG. 5 shows a cutout enlargement of the cutting head in the region (circle) V shown in FIG. 4.

The design of the cutting head 18 of the milling tool 14 according to the present teachings results from FIGS. 4 and 5. In particular, FIG. 5 shows that the cutting head 18 has, at its tip (or tip portion), a cutting region having a first cutting sub-length L2 and a first diameter d1, which is constant along a first edge length of the first cutting sub-length L2. The first diameter d1 is defined by a first envelope that is traced by the radially outermost points along the first edge length of the tip portion as the milling tool 14 rotates. This tip (or tip portion) is used (designed) for finishing a previously roughened upper part 12 of a workpiece 10 (cf. FIG. 1). The first cutting sub-length L2 corresponds to the maximum feeding (advancement) of the milling tool 14 during the finishing.

At point W1, the cutting head 18 transitions conically into a roughing segment 24 having a second cutting sub-length L2.2–L2=L2.1, which is longer than the first cutting sub-length L2. As can be seen in particular in FIG. 5, the second diameter d4 of the roughing segment 24 is constant along a second edge length of the second cutting sub-length L2.1, and is somewhat (for example, approximately 0.05 mm) smaller than the first diameter d1 of the cutting region (tip portion) having the first cutting sub-length L2. The second diameter d4 is defined by a second envelope that is traced by the radially outermost points along the second edge length of the roughing segment 24 as the milling tool 14 rotates. In this embodiment, the roughing segment 24 having the second cutting sub-length (L2.2–L2=L2.1) is configured to perform cutting and is used for roughing milling of the workpiece. The length L2.2 shown in FIG. 5 is thus the overall length of the cutting head 18, i.e. L2.1 plus L2.

A non-cutting clearance segment 28 having the once more reduced (third) diameter d3 extends axially rearward from the circumference (point) W2 over the length L3-L2.2 of the shaft 16 up to the beginning of the chucking end 26. The chucking end 26 then has a (fourth) diameter d2 that is identical to or somewhat larger than the third diameter d3.

Both the cutting head 18 and the roughing segment 24 can be coated with hard mineral, for example diamond, over their length L2 or L2.2–L2=L2.1.

The invention claimed is:

1. A milling tool made of cemented carbide, having:
    a cutting head configured as an end mill with corner radius or a ball nose end mill, the cutting head having an overall cutting length (L2.2), and
    a cylindrical shank having a chucking end and at least one clearance segment disposed axially between the cutting head and the chucking end,
    wherein the cutting head has:
        a tip portion that is coated or tipped with a hard mineral along a first cutting sub-length (L2) having a first diameter (d1) and is configured for finishing face milling of workpieces made of hard-brittle material,
        a roughing segment extending axially from the tip portion and having a second cutting sub-length (L2.2–L2=L2.1) and a second diameter (d4) that is smaller than the first diameter (d1), and
    wherein the clearance segment extends axially from the roughing segment and has a third diameter (d3) that is smaller than the second diameter (d4).
2. The milling tool according to claim 1, wherein the roughing segment is also coated or tipped with hard mineral.
3. The milling tool according to claim 1, wherein the second diameter (d4) is 0.05 mm smaller than the first diameter (d1).
4. The milling tool according to claim 1, wherein the chucking end has a fourth diameter (d2) that is equal to or greater than the third diameter (d3).
5. The milling tool according to claim 1, wherein the tip portion is coated with diamond.
6. The milling tool according to claim 5, wherein the roughing segment is also coated with diamond.
7. The milling tool according to claim 6, wherein the second diameter (d4) is 0.05 mm smaller than the first diameter (d1).
8. The milling tool according to claim 7, wherein the chucking end has a fourth diameter (d2) that is equal to or greater than the third diameter (d3).
9. The milling tool according to claim 1, wherein the first diameter (d1) transitions conically to the second diameter (d4).
10. The milling tool according to claim 1, wherein:
    the tip portion configured for finishing face milling having the first cutting sub-length (L2) includes a first edge length along which the first diameter (d1) is constant, and
    the roughing segment having the second cutting sub-length (L2.1) includes a second edge length along which the second diameter (d4) is constant.
11. The milling tool according to claim 10, wherein the second cutting sub-length (L2.1) is longer than the first cutting sub-length (L2).
12. The milling tool according to claim 10, wherein the first diameter (d1) transitions conically to the second diameter (d4).
13. The milling tool according to claim 12, wherein the second cutting sub-length (L2.1) is longer than the first cutting sub-length (L2).
14. The milling tool according to claim 13, wherein the roughing segment is also coated or tipped with hard mineral.
15. The milling tool according to claim 14, wherein the tip portion and the roughing segment are coated with diamond.
16. The milling tool according to claim 1, wherein:
    the tip portion configured for finishing face milling having the first cutting sub-length (L2) includes a first edge length,
    the first edge length defines a first envelope as the milling tool rotates and the first envelope has the first diameter (d1) which is constant along the first edge length,
    the roughing segment having the second cutting sub-length (L2.1) includes a second edge length,
    the second edge length defines a second envelope as the milling tool rotates and the second envelope has the second diameter (d4) which is constant along the second edge length.
17. The milling tool according to claim 16, wherein:
    the first envelope extends parallel to an axis of rotation of the milling tool, and
    the second envelope extends parallel to the axis of rotation of the milling tool.
18. The milling tool according to claim 17, wherein:
    each of the first edge length and the second edge length is greater than an absolute value of a difference between the first diameter (d1) of the tip portion and the second diameter (d4) of the roughing segment.
19. The milling tool according to claim 1, wherein:
    a transition region (W1) is provided between the tip portion and the roughing segment and has a length, and
    each of the first edge length and the second edge length is greater than the length of the transition region (W1).
20. The milling tool according to claim 1, wherein:
    each of the first edge length and the second edge length is greater than an absolute value of a difference between the first diameter (d1) of the tip portion and the second diameter (d4) of the roughing segment.

* * * * *